(12) United States Patent
Xia

(10) Patent No.: US 8,326,482 B2
(45) Date of Patent: Dec. 4, 2012

(54) SYSTEM AND METHOD FOR MONITORING THE STABILITY OF A HYBRID POWERTRAIN

(75) Inventor: Houchun Xia, Troy, MI (US)

(73) Assignee: GM Global Technology Operations LLC

( * ) Notice: Subject to any disclaimer, the term of this patent is extended or adjusted under 35 U.S.C. 154(b) by 580 days.

(21) Appl. No.: 12/604,725

(22) Filed: Oct. 23, 2009

(65) Prior Publication Data

US 2011/0029208 A1 Feb. 3, 2011

Related U.S. Application Data

(60) Provisional application No. 61/229,927, filed on Jul. 30, 2009.

(51) Int. Cl.
*G01M 17/00* (2006.01)
*G06F 19/00* (2006.01)
*G06F 7/00* (2006.01)
(52) U.S. Cl. ...................................... 701/33.7; 701/33.4
(58) Field of Classification Search .................. None
See application file for complete search history.

(56) References Cited

U.S. PATENT DOCUMENTS

| 6,953,409 | B2 | 10/2005 | Schmidt |
| 2007/0225886 | A1 | 9/2007 | Morris |
| 2009/0105898 | A1 * | 4/2009 | Wu et al. ..................... 701/29 |
| 2010/0087996 | A1 * | 4/2010 | Haggerty et al. ............ 701/58 |

* cited by examiner

*Primary Examiner* — Michael J. Zanelli

(57) ABSTRACT

A system and method for monitoring the stability of a hybrid powertrain system includes monitoring the system and its subsystems output response signals to its inputs to identify the system operating status. For example, for a hybrid powertrain system equipped with an electrically variable transmission (EVT), three signals are monitored. They are the two electrical motor speeds representing the direct subsystem response to their feedback control inputs and the EVT output speed representing the entire system's response. A stability monitoring system includes a mean determination module that determines a mean signal of the signals and an oscillation determination module that determines a signal oscillation signal based on the instant signal and the mean signal. The monitoring system also includes a signal mean crossing determination module that determines the signal crossing its mean signal and the oscillation peak detection, storage and comparison modules that determines system instability indicators for the control system to take corrective actions.

19 Claims, 6 Drawing Sheets

SYSTEM AND METHOD FOR MONITORING THE STABILITY OF A HYBRID POWERTRAIN

CROSS-REFERENCE TO RELATED APPLICATIONS

This application claims the benefit of U.S. Provisional Application No. 61/229,927, filed on Jul. 30, 2009. The disclosure of the above application is incorporated herein by reference in its entirety.

FIELD

The present disclosure relates generally to hybrid vehicles and, more particularly, to a method and system for monitoring a hybrid vehicle powertrain.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, is neither expressly nor impliedly admitted as prior art against the present disclosure.

Hybrid vehicles generally have two power sources. The internal combustion engine is a first power source and the electric motor is a second power source. These two power sources are integrated in a hybrid powertrain which usually consists of a small gasoline engine to achieve better fuel economy, and an electric motor or motors to provide power assistance whenever necessary. For example, power assistance may be provided when the vehicle is at launch, going up hill, towing, and high-speed passing. Some advanced hybrid powertrains are also equipped with an electrically variable transmission (EVT) to provide continuous vehicle speed changes without the restriction from engine operations.

Other advantages of hybrid vehicles include an independently operated internal combustion engine that operates at high efficiency and low cost, the regenerative brakes to recover vehicle kinetic energy at braking, and the vehicle accessories powered by an independent electric motor at a constant speed to achieve higher mechanical and energy efficiencies.

In an advanced hybrid powertrain system, the electrically variable transmission may be equipped with a feedback control system to enhance the capability and performance of the hybrid system. Driveline smoothness will be improved using the feedback control systems. Active driveline damping control may be provided to define the damping torque from the electrical motors in the electrically variable transmission to minimize driveline rotational vibrations during transient conditions such as at the engine start and stop, transmission gear shifting, and driveline clutches engaging. However, the closed-loop feedback control can cause the hybrid powertrain system to be unstable or resonate due to some unexpected and unknown system characteristics. Therefore, there is a need for a method and system for monitoring the operational stability of the hybrid powertrains equipped with a closed-loop feedback control system.

SUMMARY

The present disclosure provides a method and system for monitoring the operational stability of a hybrid powertrain system with either explicit or implicit closed-loop feedback controls.

In one aspect of the disclosure, a method of obtaining the electrically variable transmission speed signals includes generating a first electrically-variable transmission speed signal, generating a second electrically-variable transmission speed signal, generating an output speed signal of an electrically-variable transmission and determining an operating status of the electrically-variable transmission based on the first speed signal, the second speed signal and the output speed signal.

In another aspect of the disclosure, acquiring a system operation condition signal includes determining a mean signal of the system operation condition signals, determining a signal oscillation signal based on the difference of the instant signal and the mean signal, determining a signal mean crossing based on the sign of the signal oscillation signal or the instant signal and the mean, determining an oscillation peak value after each signal mean crossing, storing and comparing the oscillation peak values to detect a system instability propensity, determining a system instability indicator based on comparing and detecting results and determining a time period for the system to take corrective actions based on the system instability indicator.

In yet another aspect of the disclosure, a system instability detection module includes a mean determination module that determines a mean signal of a system operation condition signal, an oscillation determination module that determines a signal oscillation signal based on the difference of the instant signal and the mean signal, and a signal mean crossing determination module that determines the sign of the signal oscillation signal based on the instant signal and the mean. The system instability detection module includes an oscillation peak determination module that determines an oscillation peak value after each signal mean crossing, an oscillation peak storage module that stores at least two consecutive peak values or two consecutive moving average values based on a group of peak values, and an oscillation peak comparison module that determines an indicator in response to a system instability propensity. A signal spike detection module that determines the oscillation signal in a spike condition and latches a first time period for the control system to take corrective action and a signal growing detection module that determines the oscillation signal in a growing condition and latches a second time period for the control system to take corrective action is determined. The system instability detection module also includes a signal ringing detection module that determines the oscillation signal in a ringing condition and latches a third time period for the control system to take corrective action.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
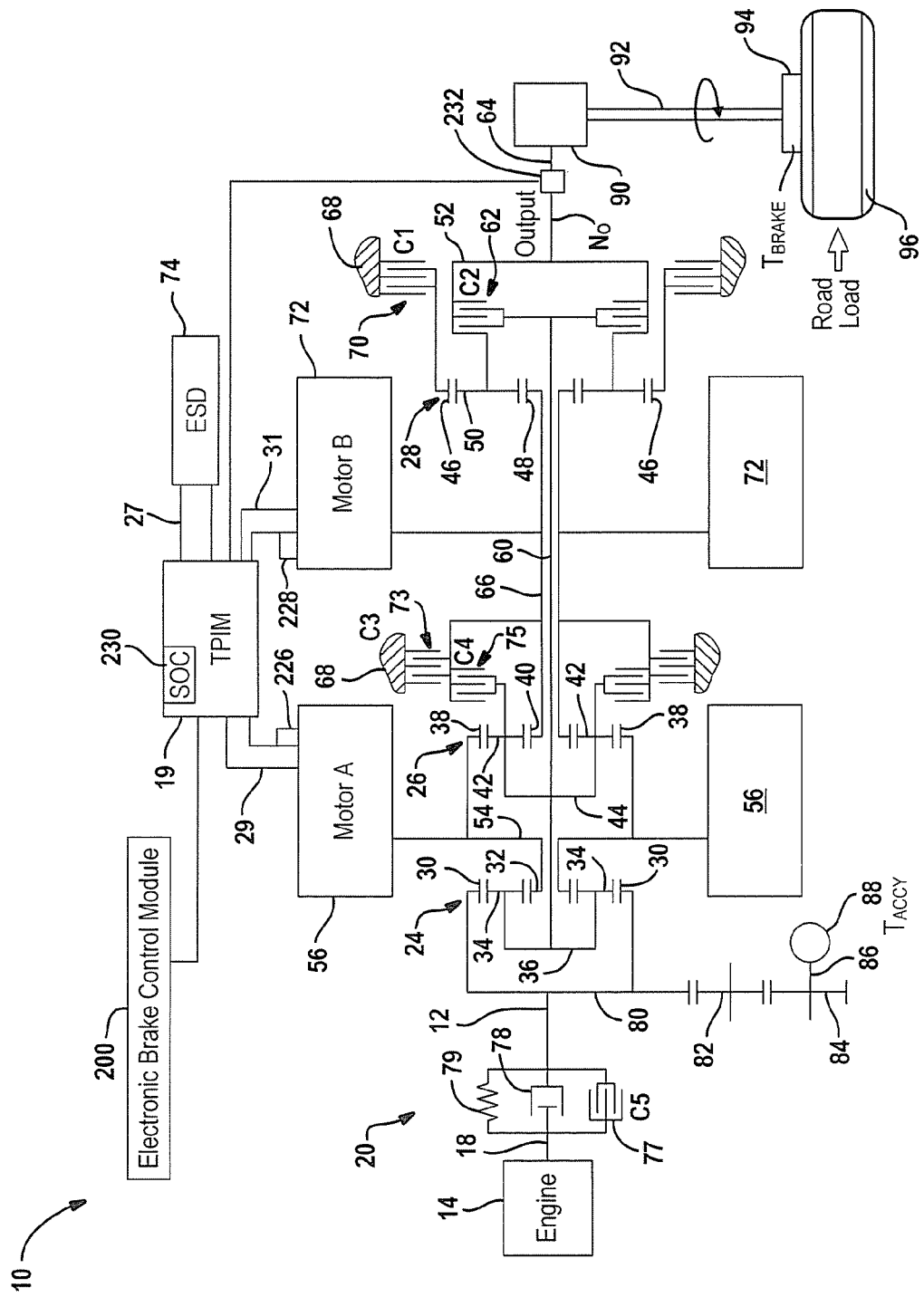
FIG. 1 is a high level block diagram of a vehicle according to the present disclosure.

The following description is merely exemplary in nature and is in no way intended to limit the disclosure, its application, or its uses. For purposes of clarity, the same reference numbers will be used in the drawings to identify similar elements. As used herein, the phrase "at least one of A, B, and C" should be construed to mean a logical (A or B or C), using a non-exclusive logical OR. It should be understood that steps within a method may be executed in different order without altering the principles of the present disclosure.

As used herein, the term "module" refers to an Application-Specific Integrated Circuit (ASIC), an electronic circuit, a processor (shared, dedicated, or group) and a memory that execute one or more software or firmware programs, a combinational logic circuit, and/or other suitable components that provide the described functionality.

Referring now to FIG. 1, a system comprising an engine 14, an electrically-variable transmission 10, control system, and driveline which has been constructed in accordance with an embodiment of the present invention is shown.

Mechanical aspects of exemplary transmission 10 are disclosed in detail in commonly assigned U.S. Pat. No. 6,953,409, patented on Oct. 11, 2005, entitled Two-Mode, Compound-Split, Hybrid Electro-Mechanical Transmission Having Four Fixed Ratios, and U.S. Patent Application Publication No. U.S. 2007/0225886 A1, published Sep. 27, 2007, entitled Parameter State Estimation, the disclosures of which are incorporated herein by reference. The exemplary two-mode, compound-split, electro-mechanical hybrid transmission embodying the concepts of the present invention is depicted in FIG. 1, and is designated generally by the numeral 10. The transmission 10 has an input member 12 that may be in the nature of a shaft which may be directly driven by an engine 14. A transient torque damper 20 is incorporated between the output shaft 18 of the engine 14 and the input member 12 of the transmission 10. The transient torque damper 20 preferably comprises a torque transfer device 77 having characteristics of a damping mechanism and a spring, shown respectively as 78 and 79. The transient torque damper 20 permits selective engagement of the engine 14 with the transmission 10, but it must be understood must be understood that the torque transfer device 77 is not utilized to change or control the mode in which the transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the transmission 10 utilizes three planetary gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear member 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear member 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the transmission 10. The carrier 52 of the third planetary gear set 28 is connected directly to the transmission output member 64.

In the embodiment described herein, wherein the transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the transmission 10. The sleeve shaft 66 is also continuously connected to a second motor/generator 72, also referred to as 'Motor B'.

All the planetary gear sets 24, 26 and 28, as well as the two motor/generators 56 and 72, are coaxially oriented, as about the axially disposed shaft 60. Motor/generators 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit, which is not described in detail herein.

The transmission 10 receives input motive torque from a plurality of torque-generative devices, including the engine 14 and the motors/generators 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present disclosure. The ESD 74 is preferably sized based upon factors including regenerative requirements, application issues related to typical road grade and temperature, and propulsion requirements such as emissions, power assist and electric range. The ESD 74 is high voltage DC coupled to transmission power inverter module (TPIM) 19 via DC lines or transfer conductors 27. The TPIM 19 is an element of the control system described hereinafter with regard to FIG. 2. The TPIM 19 communicates with the first motor/generator 56 by transfer conductors 29, and the TPIM 19 similarly communicates with the second motor/generator 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29 and 31. In regeneration control, the respective inverter receives AC current from the motor over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off (PTO) unit, designated either individually or collectively at 88, and comprises an accessory load.

The traction power inverter module (TPIM) 19 communicates with the energy storage device (ESD) 74. The TPIM 19 may include a state-of-charge (SOC) module 230 for determining the state-of-charge of the energy storage device 74. The state-of-charge corresponds to the level of battery charge. A state-of-charge signal may be expressed as a percentage of full. There are different levels of the state-of-charge and thus a state-of-charge signal may correspond to a level of charge. The hybrid vehicle may operate in various modes of operation, including a charge-depleting (CD) mode in which the vehicle operation uses the electric drive, engine subsystem, or both with a net decrease in the battery state-of-charge. A charge-sustaining (CS) mode is a mode in which vehicle operation uses the electric drive, the engine, or both at a relatively constant battery state-of-charge. This is typically a narrow range.

The electric motor A 56 may also function as a generator, and may be used to produce electrical energy for use by vehicle electrical systems, for storage in a battery, or both.

An electronic brake control module 200 may also communicate with the traction power inverter module. Various torques associated with the electronic braking system may be factored into the torque control.

The traction power inverter module 19 may be used for controlling the transmission 10. The transmission 10 may include a first motor 56 and a second motor 72. Each motor 56 and 72 may be controlled in a way to provide active damping and other functions by the traction power inverter module.

A first motor speed sensor 226 may be coupled to the first motor 56. A second motor speed sensor 228 may be coupled to the second motor 72. The motor speed sensors 226, 228 generate motor speed signals corresponding to the motor speed of the respective motors.

The transmission 10 may have an output speed sensor 232 that generates an electrical signal corresponding to the rotational speed of the output of the transmission 10. The output speed sensor 232 may be incorporated within the transmission 10 or on the outside of the transmission 10.

The traction power inverter module 19 monitors one or all of the electrical signals from the motor speed sensors 226, 228 and the output speed sensor 232. The signals from sensors 226, 228 and 232 provide system responses to various inputs from the traction power inverter module. The output speed sensor 232, in particular, represents the entire electrically-variable transmission behavior including the torque supplied to the motors and other control systems such as the gasoline engine control, clutches within the system and other feedback control loops.

Figure 2:
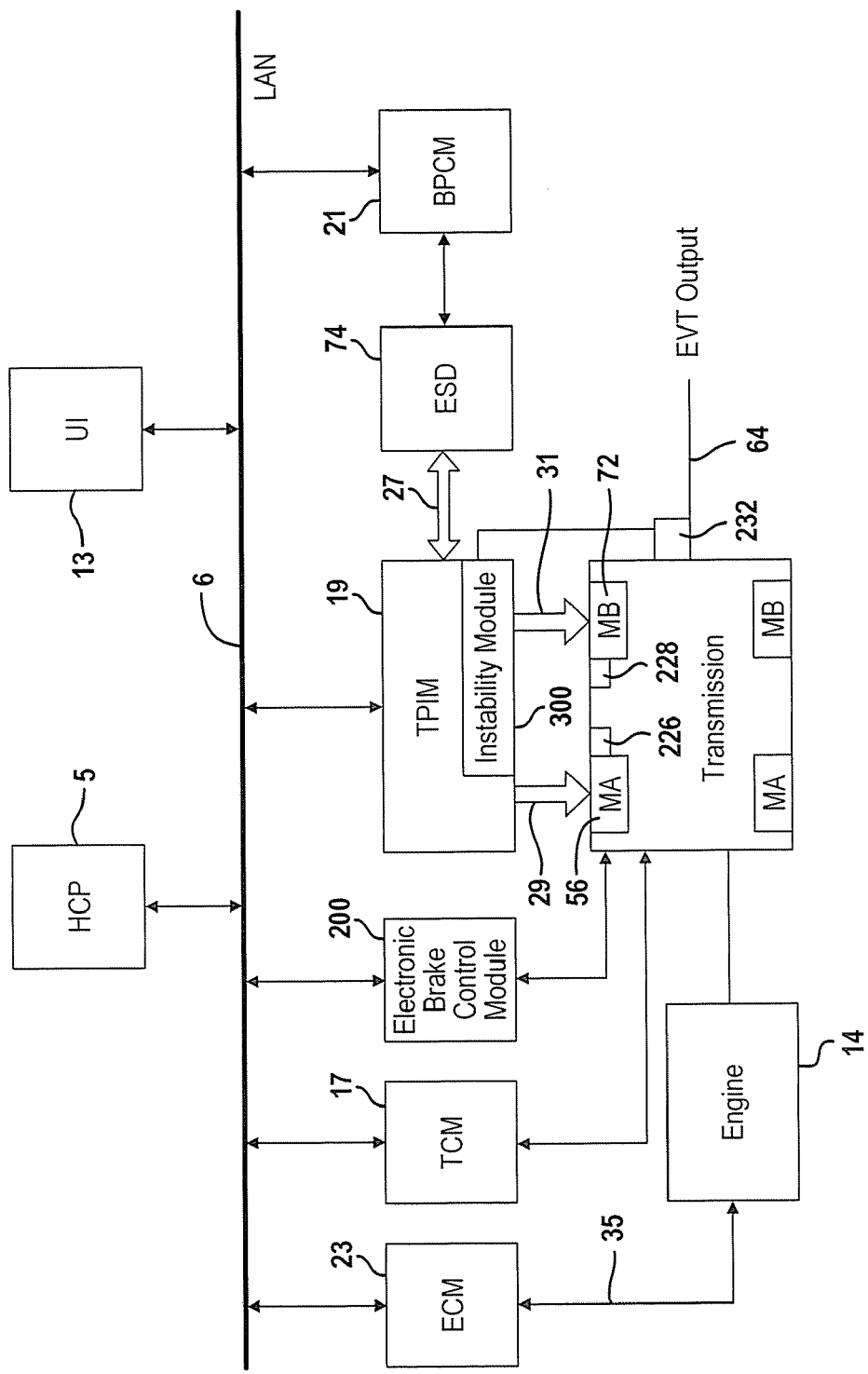
FIG. 2 is a high level operational block diagram of the control system.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture includes Engine Control Module (ECM) 23, Transmission Control Module (TCM) 17, Battery Pack Control Module (BPCM) 21, and Transmission Power Inverter Module (TPIM) 19. A Hybrid Control Module (HCP) 5 provides overarching control and coordination of the aforementioned controllers. There is a User Interface (UI) 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and vehicle speed cruise control. Each of the aforementioned controllers communicates with other controllers, sensors, and actuators via a local area network (LAN) bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, $T_{E\_CMD}$; clutch torque commands, $T_{CL\_N\_CMD}$, for the various clutches C1, C2, C3, C4 of the transmission 10; and motor torque commands, $T_{A\_CMD}$ and $T_{B\_CMD}$, for the electrical Motors A and B, respectively.

The ECM 23 is operably connected to the engine 14 and functions to acquire data from a variety of sensors and controls a variety of actuators, respectively, of the engine 14 over a plurality of discrete lines collectively shown as aggregate line 35. The ECM 23 receives the engine torque command, $T_{E\_CMD}$, from the HCP 5 and generates a desired axle torque, $T_{AXLE\_DES}$, and an indication of actual engine torque, $T_{E\_ACT}$, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_E$) to a shaft leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TOM 17 to the HCP 5 include estimated clutch torques, $T_{CL\_N\_EST}$, for each of the clutches C1, C2, C3 and C4 and rotational speed, $N_O$, of the output shaft 64. Other actuators and sensors may be used to provide additional information from the TOM to the HCP for control purposes.

The BPCM 21 is signally connected to one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for Motors A and B, $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are adjusted with motor damping torques, $T_{A\_DAMP}$ and $T_{B\_DAMP}$, to determine motor torques, $T_A$ and $T_B$, which are implemented by the control system, including the TPIM 19, to control the Motors A and B. Individual motor speed signals, $N_A$ and $N_B$, for Motor A and Motor B, respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transferred between the various computers is preferably accomplished using the aforementioned LAN 6.

Algorithms for control in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3, 6.25, 15, 25 and 100 milliseconds during ongoing vehicle operation. Alternatively, algorithms may be executed in response to occurrence of an event.

The system stability monitoring method presented in this invention includes monitoring a system and its subsystems output responses to their inputs to identify the system operating status. For example, for a hybrid powertrain and a control system as illustrated in FIGS. 1 and 2, respectively, three signals may be monitored. They are the two motor speed signals that may be obtained from the two motor speed sensors 226 and 228 and the EVT output speed signal that may be obtained from the transmission output speed sensor 232. The two motor speed signals are direct subsystem responses to the feedback control inputs applied to the two motors and will provide the direct and timely information of the motor behaviors or responses to their control inputs. The EVT output speed signal represents the entire EVT system behavior or response to the combined effects of the two feedback control torque inputs applied to the motors as well as the effects of other system controls such as the gasoline engine control, various clutches controls, and any implicit feedback control loops in the system that are not expected and not modeled in the explicit feedback control designs. Therefore, the system stability monitoring method presented here is able to detect the entire system's instability conditions and, furthermore, to pinpoint which feedback control loops cause the system instability.

A system instability detection module 300 is illustrated in FIG. 2. The system instability detection module 300 is a generic detection module that may monitor signals from the engine control module 23, the transmission control module 17 and/or the hybrid control module 5 for a system instability detection whenever it is needed.

The system instability detection module 300 may receive inputs from the first motor, second motor and the electrically-variable transmission output. The various modules within the detection module 300 may receive each of the three signals. In the following example, the stability of the system may be detected from the first motor speed, the second motor speed, the electrically-variable transmission output speed, or a combination of all three. The signals individually or collectively may be referred to as a transmission speed signal.

Figure 3:
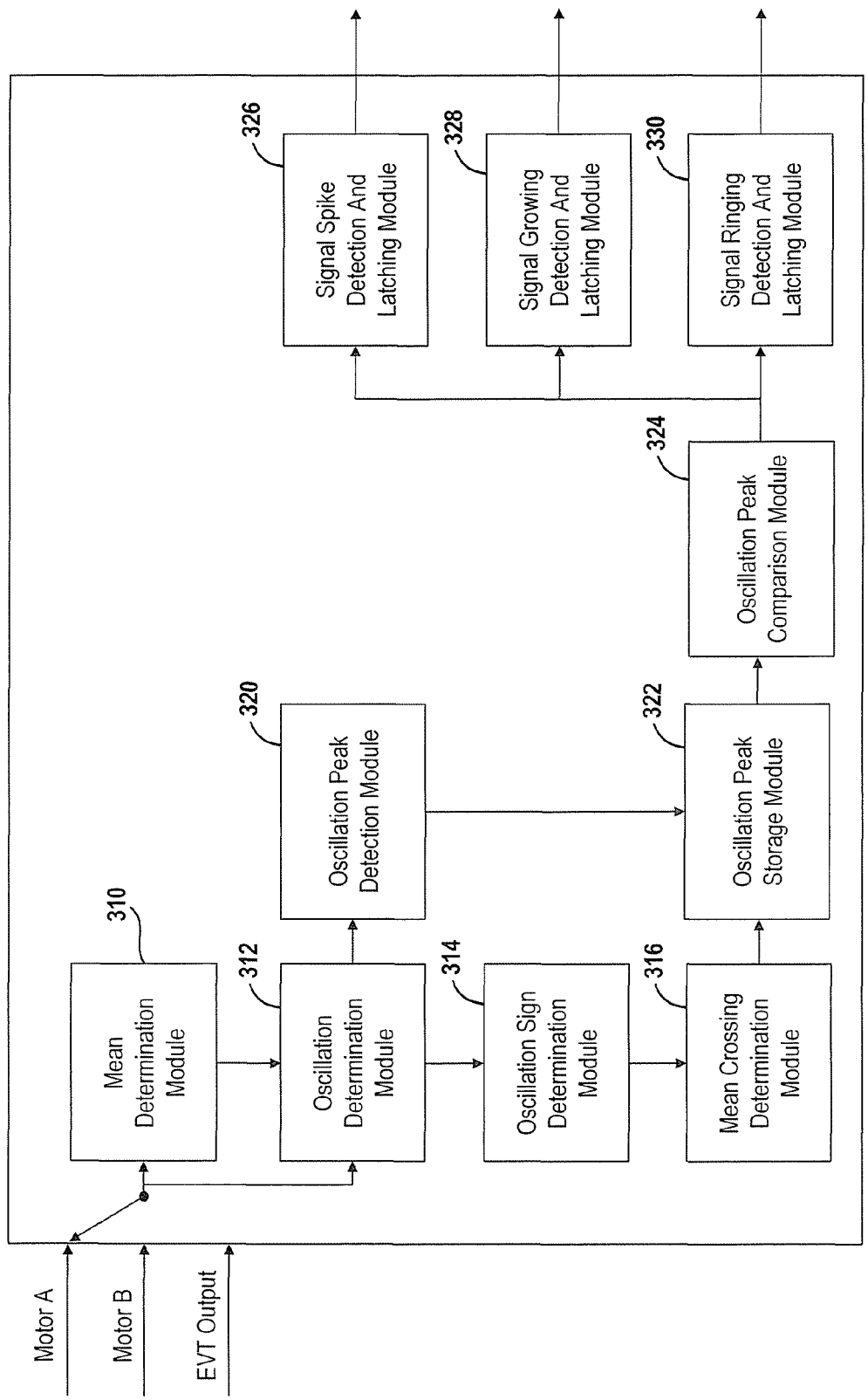
FIG. 3 is a block diagrammatic view of a system instability detection module according to the present disclosure.

Referring now to FIG. 3, a specific example is provided. The transmission speed signal (Motor A speed) is provided to a mean determination module 310. The mean determination module 310 determines the mean signal of the transmission speed signal. The signal mean may be determined using an adjustable low pass filter. The mean determination module 310 generates a mean signal that is provided to the oscillation determination module 312. The oscillation determination module 312 determines an oscillation signal that is calculated as the difference between the instant transmission speed signal and the mean signal or a reference signal. The output of the oscillation determination module 312 is an oscillation signal that oscillates around the mean signal.

The system instability detection module 300 may also include an oscillation sign determination module 314. The oscillation sign determination module 314 determines an oscillation signal sign. If the instant signal is greater than its mean signal, the oscillation signal sign is determined as positive. On the other hand, if the instant signal is smaller than the mean, the oscillation signal sign is negative. The oscillation signal sign determined in module 314 is then provided to a mean crossing determination module 316. The mean crossing determination module 316 determines a signal crossing. The signal crossing is the transmission speed signal crossing its mean signal. The mean crossing determination module generates a signal crossing signal. The signal oscillation determined by the oscillation determination module 312 may be provided to an oscillation peak detection module 320. The oscillation peak detection module 320 detects the peak value of the oscillation signal when an oscillation amplitude is greater than a predefined threshold. The peak value of the signal amplitude may be continuously updated, recorded and compared to the previously-recorded peak value. The signal peak values are stored in an oscillation peak storage module 322 that stores the peak value before each signal mean crossing.

An oscillation peak comparison module 324 may be used to detect any abnormalities in the signal amplitude peaks. The oscillation peak comparison module 324 may be used to identify different types of abnormalities, including a spike amplitude, growing amplitude or ringing amplitude. Spikes are determined when an abrupt system oscillation is detected. This may lead to physical breakages of the system hardware or cause eminent damage. A second level of abnormalities is the growing oscillation that indicates that the system oscillation amplitude is growing which may represent an unstable or resonant behavior. A ringing detection may be generated when the amplitude of the signal indicates a ringing signal characterized by similar amplitudes for successive peaks.

The oscillation peak comparison module 324 may be in communication with a signal spike detection module 326, a signal growing detection module 328, and a signal ringing detection module 330. It should be noted that each of the transmission speed signals from the motors and the transmission 10 output may have its own spike indicator, growing indicator or ringing indicator. All three transmission speed signals may also be used simultaneously to determine the spikes, a growing indicator, and a ringing indicator.

Figure 4A:
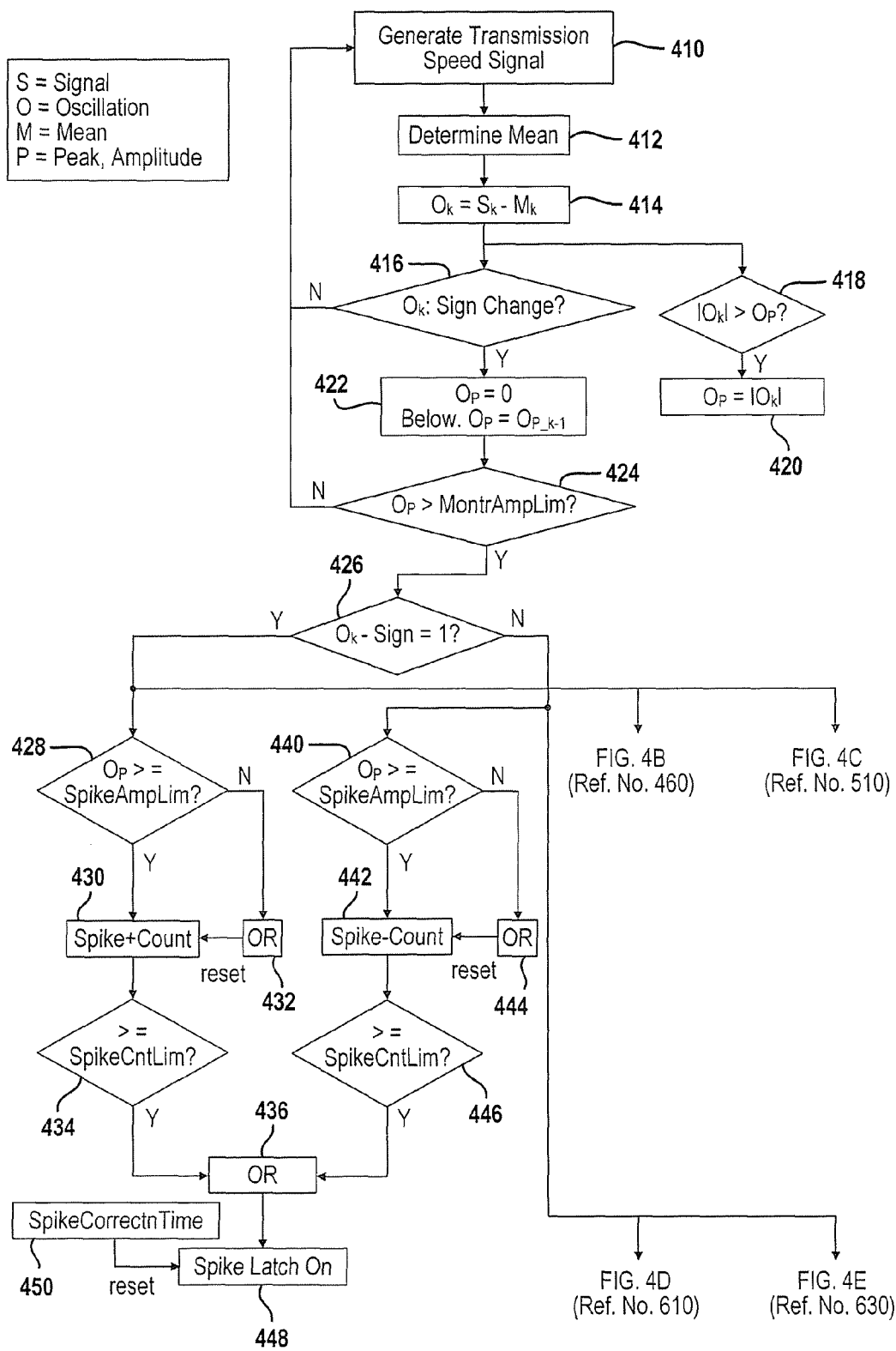
FIGS. 4A-4E are the flowcharts of a method for detecting a signal stability state and activating warning signs according to the principles of the present disclosure.

Referring now to FIG. 4A, in step 410, the instant transmission speed signal at time, k, ($S_k$) is acquired. This may be referred to as the current signal. As mentioned above, the transmission speed signal ($S_k$) may be one of the motors or the electrically-variable transmission's output. In step 412, the signal mean signal of the transmission speed is generated.

The current oscillation ($O_k$) is equal to the signal (the transmission speed signal) minus the mean which is determined in step 414. If the absolute value of the oscillation is greater than the peak oscillation ($O_p$) in step 418, step 420 sets the peak to the current absolute value of the current oscillation. In this manner, the peak value will be increased as the peak grows.

Referring back to step 416, if the sign changes in the current oscillation ($O_k$) relative to its mean signal, the peak oscillation ($O_p$) is set to zero in step 422 and the previous oscillation peak ($O_{p\_k-1}$) will be used as the peak value ($O_p$) for all the calculations after step 422. The oscillation peak ($O_p$) is set to zero after each signal mean crossing so that the next peak can be detected. In step 424, the peak is compared to a predetermined monitoring amplitude limit (MontrAmpLim). If the peak is greater than the predetermined amplitude limit in step 424, step 426 checks the sign of the current oscillation signal. If the sign is equal to one, it means that the instant signal is greater than its mean signal and the current oscillation peak is called a positive peak. Otherwise, the current oscillation peak is called a negative peak. Both the positive and negative peak signals will be examined, separately, to determine any abnormalities.

If the sign of the current transmission speed signal oscillation ($O_k$) is equal to one (i.e., a positive oscillation peak), step 428 determines whether the peak is greater than or equal to a spike amplitude threshold limit. If the peak value is greater than or equal to the spike amplitude threshold limit, step 430 increases the positive spike count (Spike+). In step 428, if the peak is not greater than or equal to the spike threshold, step 432 resets the spike counter. After step 430, step 434 determines whether the spike count is greater than or equal to a predetermined spike count limit. If the spike count is above the predetermined spike count limit, step 436 is performed and the spike latch is turned on in step 448. The spike signal will be latched at ON until the spike correction time is reached. The spike correction time is designed for the hybrid powertrain control system to take remedial actions to correct the spike situation of the transmission speed signal, and the spike latch will be reset to OFF when the correction time is over.

Referring back to step 426, when the sign of the current oscillation signal is not equal to one (i.e., a negative oscillation peak), step 440 is performed. These steps correspond with a signal below the mean signal. In step 440, it is determined whether or not the oscillation peak ($O_p$) is greater than or equal to the spike amplitude limit. If the peak value is greater than the spike amplitude limit, the negative spike count (Spike−) is increased in step 442. In step 440, if the peak value is not greater than or equal to the spike amplitude limit, step 444 is performed. In step 444, the spike count is reset. In step 446, if the spike count is greater than or equal to a predetermined spike count limit, step 436 is performed. Step 436 is an "OR" step that logically ORs the values from above and below the mean signals, which means either a positive or negative spike can trigger the spike latch to the ON position. Like that in the positive case, after step 436 the spike latch is latched to the ON position in step 448 until the spike correction time is passed in step 450 and the spike latch is reset to OFF.

Figure 4B:
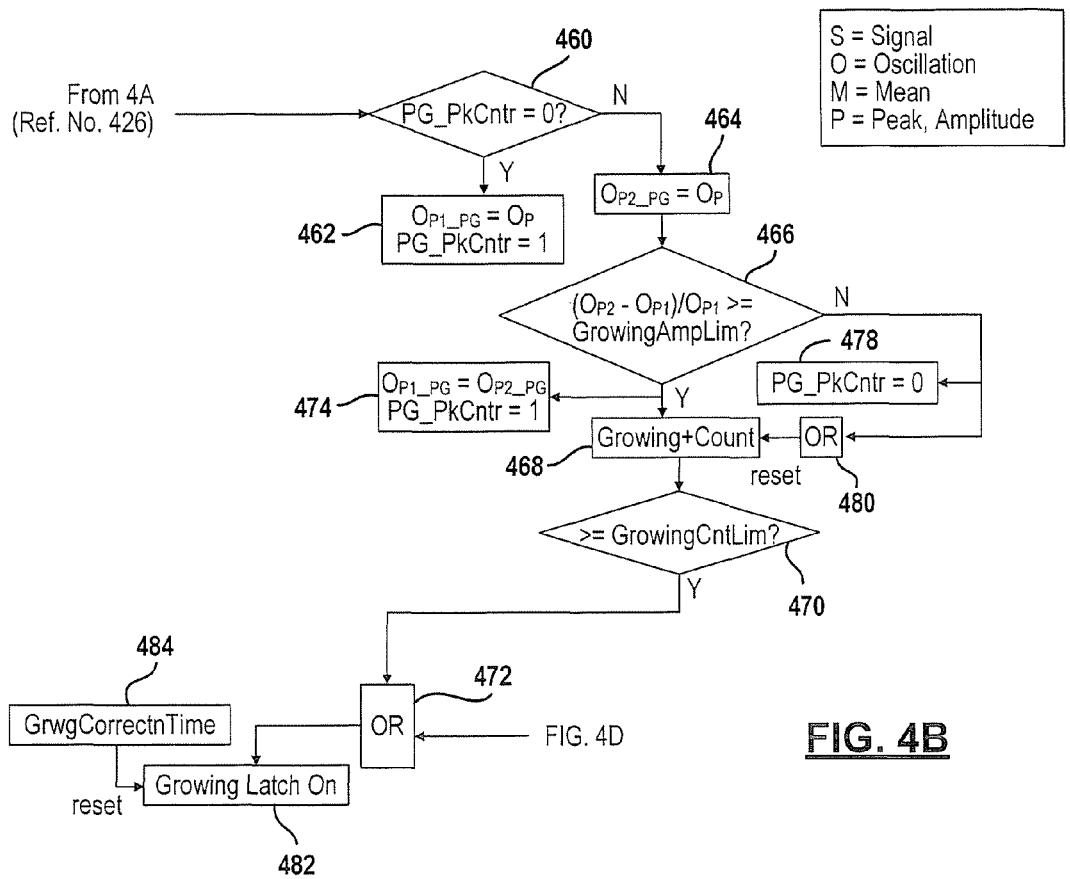

Referring now to FIG. 4B, after step 426 and simultaneously with the spike amplitude determination set forth above in steps 428-450, a growing determination and ringing determination may also be performed. In order to determine when a signal is growing or ringing, two consecutive peaks (or the moving average of several peaks) of the signal has to be recorded and compared. In step 460, a peak counter for checking the positive growing conditions is established. A counter value equal to zero indicates that there is no peak value currently recorded, while a counter value equal to one indicates that there is a peak value currently recorded and this peak value may be named as peak 1. Therefore, when the system stability monitoring process is started, the peak counter value is equal to zero (no peak value is recorded), and in step 462 the current oscillation peak value ($O_p$) is recorded as the first peak for the positive growing determination ($O_{P1\_PG}$). Also in step 462, the peak counter value is set to one which indicates the first peak value has been recorded for evaluation or comparison. When the second oscillation peak is detected, the peak counter value in step 460 is not equal to zero (but set to one in previous step 462), and step 464 is performed. In step 464, the second peak value is recorded as the second peak for the positive growing determination ($P_{P2\_PG}$). And in step 466, the first and second peak values recorded will be used to determine if the signal oscillation meets an oscillation growing definition. This procedure of recording two consecutive oscillation peak values may be used for determining the negative growing, the positive ringing, and the negative ringing conditions.

In step 466, the percentage or ratio of the difference between the current peak value versus the previous peak value over to the previous peak value $((O_{P2}-O_{P1})/O_{P1})$ is determined and compared to a growing amplitude limit (GrowingAmpLim). When the percentage or ratio is greater than the growing amplitude limit, step 468 increases a positive growing count (Growing+) by one and step 470 determines whether the total growing count is greater than a growing count limit. When the growing count is greater than a growing count limit, step 472 is performed. Step 472 uses a logical OR to combine the data from FIG. 4C as described below.

After step 466, the current second peak value ($O_{P2\_PG}$) is assigned to the new first peak value ($O_{P1\_PG}$) and the peak counter is set to one in step 474. In this manner, the next peak value detected in step 426 in FIG. 4A may be recorded as the new second peak value ($O_{P2\_PG}$) and the positive growing determination process for the oscillation signals may continue in step 466.

Referring back to step 466, when the percentage is not above the growing amplitude limit indicating that no positive growing condition is detected, the positive growing peak counter is set to zero in step 478 and the next peak value detected in step 426 in FIG. 4A may be recorded as the new first peak value ($O_{P1\_PG}$) to restart the peak recording and evaluation.

Referring back to step 466, when the percentage is not above the growing amplitude limit indicating that no positive growing condition is detected, step 480 is also performed. In step 480, the positive growing counter is reset to zero and any new peaks that meet the growing conditions in step 466 will trigger the positive growing count starting from one.

After step 472, step 482 sets a growing latch to ON which provides an indicator that the oscillation signal is growing. In step 484, after a predetermined amount of time for the hybrid powertrain control system to take corrective actions the growing latch is reset to OFF.

Referring back to step 426 and to FIG. 4C, when the sign of the oscillation signal is positive, step 510 is also performed. Step 510 determines whether the positive ringing peak counter (PR_PkCntr) is zero. When the positive peak ringing counter is equal to zero, step 512 sets the first oscillation peak for positive ringing detection ($O_{P1\_PR}$) equal to the current oscillation peak value and the positive ringing peak counter (PR_PkCntr) equal to one.

In step 510, if the positive ringing peak counter (PR_PkCntr) is not equal to zero indicating that the first peak value is already recorded, step 514 sets a second oscillation peak value ($O_{P2\_PR}$) equal to the current peak value ($O_p$). In step 516, the percentage or ratio of the difference of the second peak value and the first peak value is determined by subtracting the first peak value from the second peak value, dividing by the first peak value and comparing the peak ratio to a ringing amplitude limit. When the percentage is greater than the ringing amplitude limit, step 518 increases a positive ringing count (Ringing+) by one. Step 520 compares the count to a ringing count limit (RingingCntLim). When the count is greater than or equal to the ringing count limit, step 522 is performed. After step 522, step 544 latches a ringing indicator to ON. Step 546 resets the ringing latch to OFF after a predetermined correction time for the hybrid powertrain control system to correct the system oscillation ringing conditions.

Referring back to step 516, before step 518, step 550 sets the new first peak value to the previous second peak value and the positive ringing peak counter to one. This allows the next peak to be recorded as the new second peak value and the evaluation to continue.

Referring back to step 516, when the percentage is not greater than or equal to the ringing amplitude limit, step 560 sets the peak counter (PkCntr) equal to zero and step 562 resets the positive ringing count in step 518 like that for the positive growing case in steps 478 and 480.

Figure 4D:
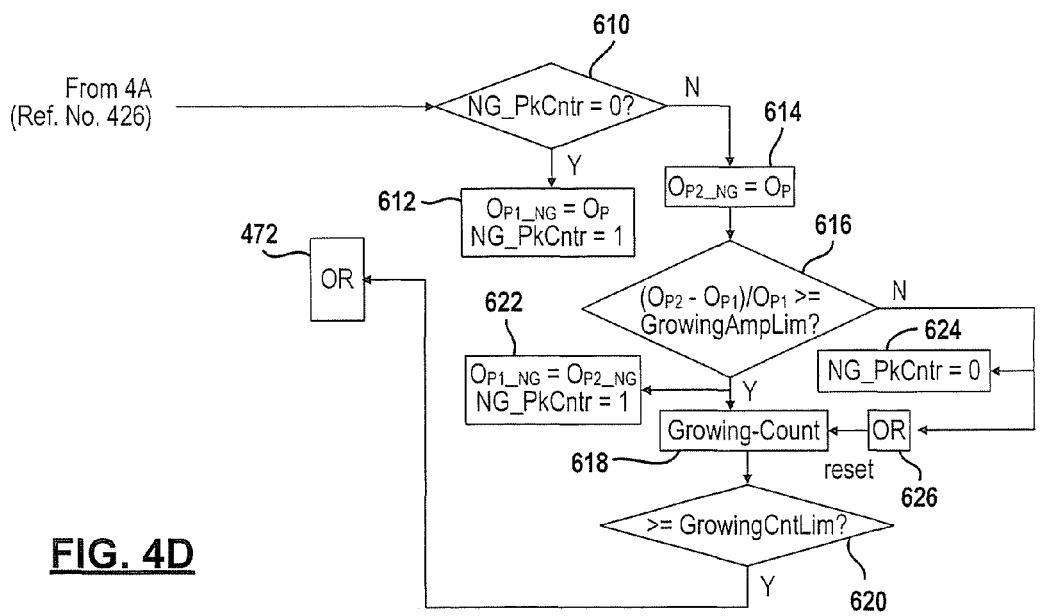
Figure 4C:
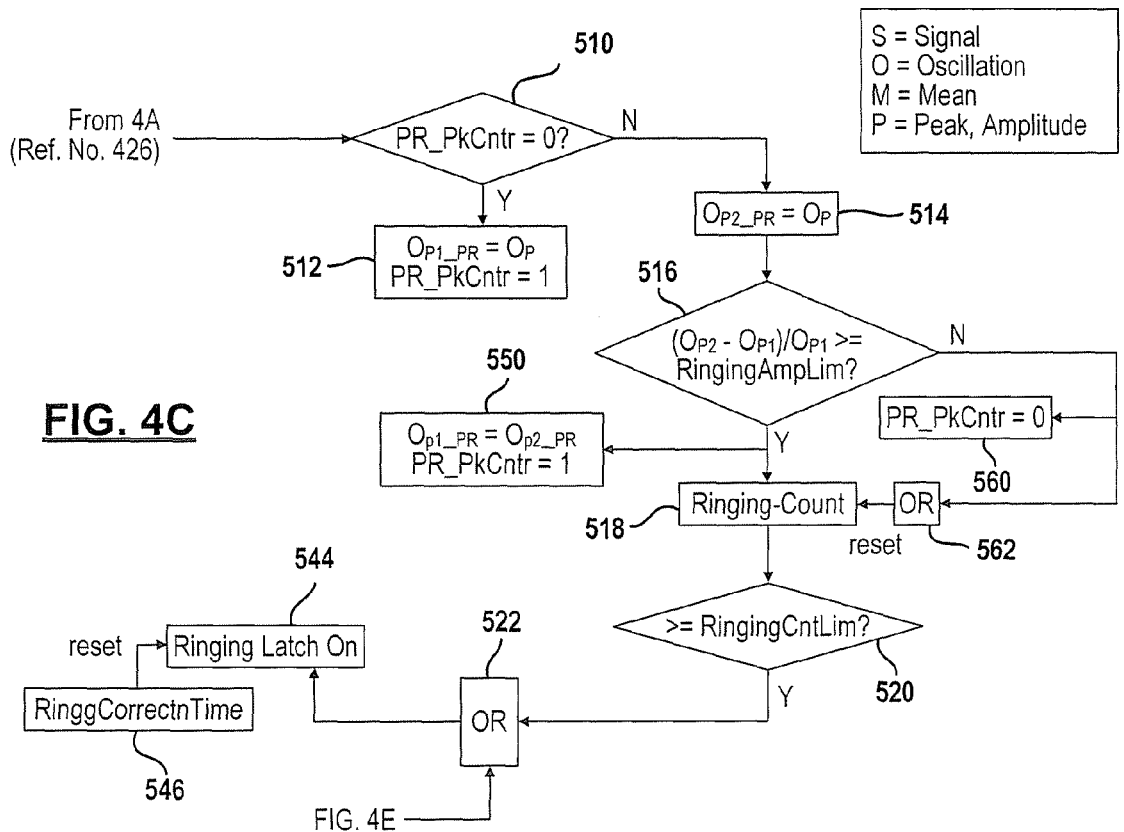
Figure 4E:
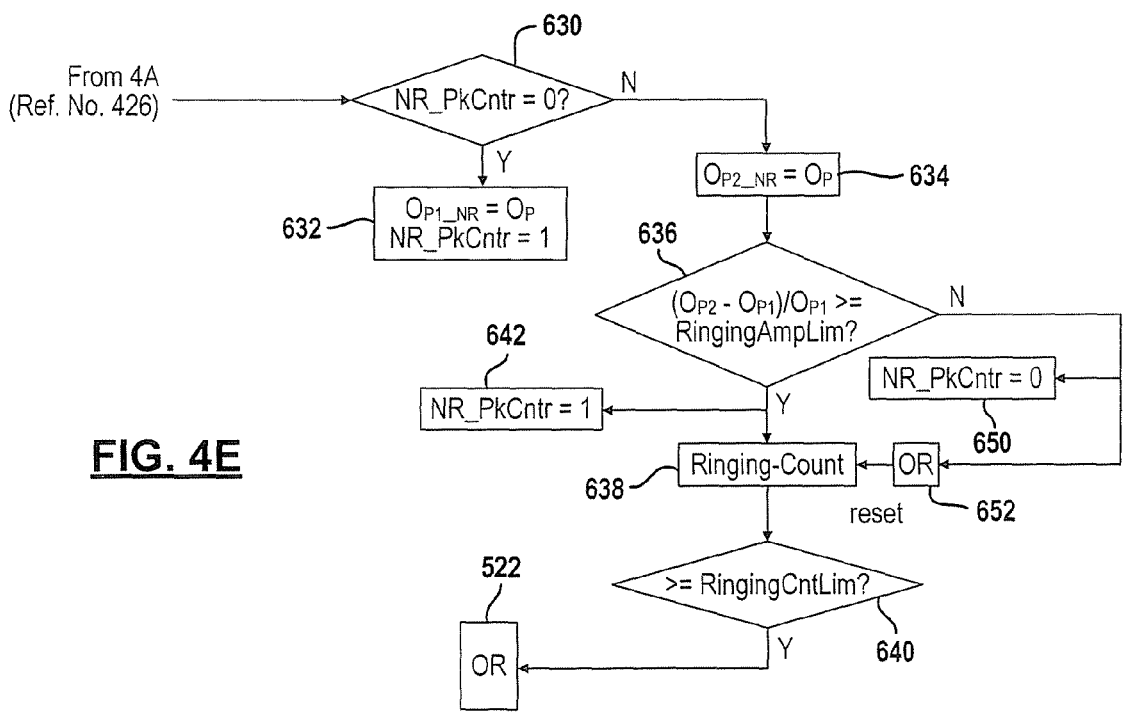

It should be noted that steps 460-470 and steps 510-520 correspond to determining the growing or ringing amplitudes when the oscillation peak is above the mean signal (i.e. positive peaks). In FIGS. 4D-E, whether the signal peak value is growing or ringing below the mean signal is determined. Step 610 is performed when the oscillation sign is negative in step 426. When the negative growing peak counter (NG_PkCntr) is equal to zero, the first negative growing peak value ($O_{P1\_NG}$) is set to the current peak value and the negative growing peak counter is set to one in step 612. Step 614 is performed when the negative peak counter is not equal to zero. Step 614 sets the second negative growing peak value ($O_{P2\_NG}$) equal to the current peak value $O_p$. In step 616, the first peak value and second peak value ratio or percentage are compared to a growing amplitude limit. The ratio of the difference of the second peak value and first peak value $((O_{P2}-O_{P1})/P_{P1})$ is compared to the growing amplitude limit. When the percentage is above the growing amplitude limit, step 618 increases the negative growing count (Growing−) by one. When the total count is above the count limit in step 620, step 472 is performed which sets the growing latch to ON in step 482.

Referring back to step 616, when the amplitude ratio is above the growing amplitude limit, step 622 sets the first negative growing peak value ($O_{P1\_NG}$) equal to the second negative growing peak value ($O_{P2\_NG}$) and the negative growing peak counter equal to one.

Referring back to step 616, if the percentage is not greater than the growing amplitude limit, step 624 sets the peak counter equal to zero and step 626 sets or resets the negative growing counter (Growing−) to zero.

After step 426 in FIG. 4E, step 630 determines a negative ringing peak counter. In step 630, if the negative ringing peak counter (NR_PkCntr) is equal to zero, step 632 sets the first oscillation peak value ($O_{P1\_NR}$) equal to the current oscillation peak value ($O_p$) and the negative ringing peak counter equal to one.

In step 630, when the negative ringing peak counter is not equal to zero, step 634 sets the second oscillation peak value ($O_{P2\_NR}$) equal to the current peak value ($O_p$). After step 634, step 636 determines the percentage in a similar manner to step 616. When the percentage is above or equal to the ringing amplitude limit threshold in step 636, step 638 increases the negative ringing count value (Ringing−) by one. In step 640, if the count value is greater than or equal to the ringing count limit, step 522 is again performed which provides an indicator for the latch being latched in step 544.

Referring back to step 636, when the percentage is above a ringing amplitude limit, step 642 sets the new first oscillation peak ($O_{P1\_NR}$) equal to the previous second oscillation peak ($O_{P2\_NR}$) and the negative ringing peak counter equal to one.

Referring back to step 636, when the percentage is not greater than the ringing amplitude limit, step 650 sets the peak counter equal to zero and step 652 resets the negative ringing counter to zero in step 638.

For simplicity, steps 418, 434, 446, 470, 520, 620 and 640 do not have "NO" logic associated therewith. It is presumed that the NO logic would restart the steps at step 410 since they correspond to outside the limit decisions.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   generating a first speed signal of an electrically-variable transmission;
   generating a second speed signal of the electrically-variable transmission;
   generating an output speed signal of the electrically-variable transmission;
   determining an operating status of the electrically-variable transmission based on the first speed signal, the second speed signal, and the output speed signal; and
   controlling an indicator in response to the operating status.

2. A method as recited in claim 1 wherein the first speed signal comprises a first motor speed signal.

3. A method as recited in claim 1 wherein the second speed signal comprises a second motor speed signal.

4. A method as recited in claim 1 wherein controlling the indicator comprises controlling the indicator to indicate a signal spike, a growing signal or a ringing signal.

5. A method of monitoring stability of a system, the method comprising:
   acquiring a system operation condition signal;
   determining a mean signal of the system operation condition signal;
   determining an oscillation signal based on a difference of the system operation condition signal and the mean signal;
   determining an oscillation signal sign based on whether the system operation condition signal is greater or smaller than the mean signal;
   determining a signal mean crossing based on (i) the system operation condition signal and the mean signal, or (ii) the oscillation signal sign;
   determining an oscillation peak value after each signal mean crossing;
   storing positive oscillation peak values and negative oscillation peak values;
   comparing the positive oscillation peak values and the negative oscillation peak values, separately, to detect a system instability propensity;
   determining a system instability indicator based on the system instability propensity; and
   determining a time period for the system to take corrective actions based on the system instability indicator.

6. A method as recited in claim 5 wherein acquiring the system operation condition signal comprises acquiring an output speed signal of an electrically-variable transmission in a case of monitoring a hybrid powertrain.

7. A method as recited in claim 5 wherein acquiring the system operation condition signal comprises acquiring a motor speed signal of an electrically-variable transmission in a case of monitoring a hybrid powertrain.

8. A method as recited in claim 5, further comprising:
   comparing the oscillation peak value to a ringing threshold; and
   in response to the oscillation peak value being above the ringing threshold, generating an oscillation ringing indicator.

9. A method as recited in claim 5, further comprising:
   comparing the oscillation peak value to a spike threshold; and
   in response to the oscillation peak value being above the spike threshold, generating an oscillation spike indicator.

10. A method as recited in claim 5, further comprising:
    comparing the oscillation peak value to a growing threshold; and
    in response to the oscillation peak value being above the growing threshold, generating an oscillation growing indicator.

11. A method as recited in claim 5, further comprising:
    determining the system instability indicator in response to both the positive oscillation peak values and the negative oscillation peak values.

12. A system instability detection module comprising:
    a mean determination module that determines a mean signal of a system operation condition signal;
    an oscillation determination module that determines an oscillation signal based on a difference of the system operation condition signal and the mean signal;
    an oscillation sign determination module that determines an oscillation signal sign based on whether the system operation condition signal is greater than the mean signal (called a positive oscillation) or smaller than the mean signal (called a negative oscillation);
    a signal mean crossing determination module that determines whether the oscillation signal crosses the mean signal;
    an oscillation peak determination module that determines an oscillation peak value after each signal mean crossing;

an oscillation peak storage module that stores
  (i) at least two consecutive positive oscillation peak values and two consecutive negative oscillation peak values, or
  (ii) two consecutive positive moving average values based on a group of positive oscillation peak values and two consecutive negative moving average values based on a group of negative oscillation peak values;
an oscillation peak comparison module that determines an indicator in response to a system instability propensity based on the at least two consecutive positive oscillation peak values and the two consecutive negative oscillation peak values;
a signal spike detection and latching module that determines the indicator in a spike condition and latches a first time period to take corrective action;
a signal growing detection and latching module that determines the indicator in a growing condition and latches a second time period to take corrective action; and
a signal ringing detection and latching module that determines the indicator in a ringing condition and latches a third time period to take corrective action.

13. A system instability detection module as recited in claim 12 wherein the system operation condition signal comprises an output speed signal of an electrically-variable transmission or a motor speed signal of the electrically-variable transmission in a case of monitoring a hybrid powertrain.

14. A system instability detection module as recited in claim 12 wherein the indicator comprises an oscillation ringing indicator.

15. A system instability detection module as recited in claim 14 wherein the oscillation peak comparison module determines the oscillation ringing indicator by
  comparing the oscillation peak value to a ringing threshold; and
  in response to the oscillation peak value being above the ringing threshold, generating the oscillation ringing indicator.

16. A system instability detection module as recited in claim 12 wherein the indicator comprises an oscillation spike indicator.

17. A system instability detection module as recited in claim 16 wherein the oscillation peak comparison module
  compares the oscillation peak value to a spike threshold; and
  in response to the oscillation peak value being above the spike threshold, generates the oscillation spike indicator.

18. A system instability detection module as recited in claim 12 wherein the indicator comprises an oscillation growing indicator.

19. A system instability detection module as recited in claim 18 wherein the oscillation peak comparison module determines the oscillation growing indicator by
  comparing the oscillation peak value to a growing threshold; and
  in response to the oscillation peak value being above the growing threshold, generating the oscillation growing indicator.

* * * * *